(12) United States Patent
Hallidy

(10) Patent No.: US 6,528,967 B2
(45) Date of Patent: Mar. 4, 2003

(54) PERMANENT MAGNET BRUSHLESS ELECTRIC MOTOR SYSTEM AND METHOD OF USING SAME

(75) Inventor: William M. Hallidy, Glendora, CA (US)

(73) Assignee: VSCF, Inc., Addison, TX (US)

( * ) Notice: Subject to any disclaimer, the term of this patent is extended or adjusted under 35 U.S.C. 154(b) by 0 days.

(21) Appl. No.: 09/881,152

(22) Filed: Jun. 14, 2001

(65) Prior Publication Data

US 2002/0043954 A1 Apr. 18, 2002

Related U.S. Application Data

(60) Provisional application No. 60/241,210, filed on Oct. 17, 2000.

(51) Int. Cl.$^7$ ................................................. H02P 5/34
(52) U.S. Cl. ........................ 318/808; 318/254; 318/138; 318/439
(58) Field of Search ................................ 318/254, 138, 318/439, 779, 701, 808

(56) References Cited

U.S. PATENT DOCUMENTS

| | | | | |
|---|---|---|---|---|
| 3,584,276 A | * | 6/1971 | Ringland et al. | 318/721 |
| 3,636,423 A | * | 1/1972 | Jenkins | 318/809 |
| 3,845,372 A | * | 10/1974 | Ringland et al. | 318/779 |
| 4,088,934 A | * | 5/1978 | D'Atre et al. | 318/802 |
| 4,862,052 A | * | 8/1989 | Unsworth et al. | 318/368 |
| 5,151,642 A | * | 9/1992 | Lombardi et al. | 318/779 |
| 5,587,641 A | * | 12/1996 | Rozman | 318/439 |
| 5,990,590 A | * | 11/1999 | Roesel et al. | 310/112 |
| 6,388,416 B1 | * | 5/2002 | Nakatani et al. | 318/138 |

OTHER PUBLICATIONS

E. Bischof, et al., (1999) "High Output Alternator Concepts," *Society of Automotive Engineers*.

Matrix Engineering "5AEC–P Series Positive Response Electromagnetic Stationary Field Pilot Mount Tooth Clutch."

* cited by examiner

*Primary Examiner*—Rita Leykin
(74) *Attorney, Agent, or Firm*—Foley & Lardner; Bernard L. Kleinke

(57) ABSTRACT

A brushless motor-generator has a stator with armature windings for polyphase operation and a rotor having at least one pair of permanent magnet poles. A controller varies the magnitude of the alternating-current voltage applied to the armature windings for controlling the operating motor power factor to permit the rotor magnetic field to operate at the optimum or at least at an improved torque angle with respect to the stator magnetic field in the motoring mode, with little or no torque pulsations at substantially all or at least most conditions of motor load.

10 Claims, 15 Drawing Sheets

PERMANENT MAGNET BRUSHLESS ELECTRIC MOTOR SYSTEM AND METHOD OF USING SAME

This application claims benefit to U.S. provisional application serial No. 60/241,210, filed Sep. 17, 2000.

BACKGROUND OF THE INVENTION

1. Field of the Invention

The present invention relates to permanent magnet brushless electric motors. More specifically, this invention relates to means for operating a permanent magnet brushless electric motor as an AC synchronous motor with full rated starting torque capability and minimum 'amps per unit torque' under substantially all loading conditions.

2. Related Art

Variable speed permanent magnet (PM) brushless DC (BLDC) motors are commonplace today. The basic prior art BLDC motors incorporate a stator having a 3-phase armature winding and a permanent magnet rotor mounted coaxially within the stator structure. The motor also incorporates some form of rotor shaft or rotor magnetic field position sensor, such as Hall Effect sensors, back EMF sensors, synchronous resolvers, etc.

The sensors act to control the off-on-off timing of electronic power switches controlling the flow of electric current in the 3-phase AC windings of the stator armature to cause a motoring action.

The basic prior art BLDC motors operate on the principle of selectively energizing two of the three phases of the armature winding. Every 60 electrical degrees of rotation, the rotor position or magnetic field position sensor signals the control electronics to de-energize one of the two energized phases and to energize the formerly de-energized phase.

A typical switching sequence is described in the following, with 'A', 'B', and 'C, representing the three phase windings, and '+', '−' representing the electrical polarity of the flow of electrical current:

(A+ to B−), (A+ to C−), (B+ to C−), (B+ to A−), (C+ to A−), (C+ to B−), and repeat (A+ to B−), - - -

The armature winding of a 2-pole BLDC motor experiences six distinct switching steps for each 360 mechanical degrees of rotation, while the winding of a 4-pole BLDC motor experiences 12 distinct switching steps. As a consequence, the typical present day BLDC motor has inherent torque pulsations.

Further, any error in the timing of the off-on-off action of the electronic power switches relative to the rotor position adds to the torque pulsations of the typical BLDC motor.

Additionally, the forced timing of the switching of the electric current in the armature windings forces the rotor magnetic field to operate at a substantially fixed 'torque angle' relative to the armature magnetic field, regardless of load. This fixed torque angle is the optimum torque angle for only one magnitude of motor torque. At other magnitudes of torque, the motor performs at less than the optimum 'torque-per-amp'.

Further, any errors in the placement or position of the sensors relative to the armature windings decreases the torque-per-amp performance of the motor.

Conventional prior art BLDC motors are further limited to an inherent maximum motoring rotational speed determined by the magnitude of the DC voltage applied to the control system. At rotational speeds above the inherent maximum motoring speed, the conventional BLDC motor becomes a generator. Special, and costly, "field weakening" circuits, conducting large electric currents, are required to overcome the magnetic strength of modern day permanent magnets to enable conventional prior art BLDC motors to operate as a motor at rotational speeds greater than the rotational speed at which the motor would otherwise become a generator.

In engine driven systems, it is desirable to have a single electric motor-generator system to provide both the engine starting function and the auxiliary electric power generation function. Many small and medium aircraft have engine systems that include a 28-volt DC brush-and-commutator motor-generator (starter/generator) to provide the engine starting function and to also provide the aircraft electric power generation function.

The 28-volt DC brush-and-commutator starter/generators used on present day helicopters and general aviation aircraft require frequent and expensive maintenance relating to the brushes and commutator. It would be advantageous to provide a brushless 28-volt DC starter/generator system to reduce the maintenance cost.

DESCRIPTION OF CERTAIN EMBODIMENTS OF THE INVENTION

Figure 1:
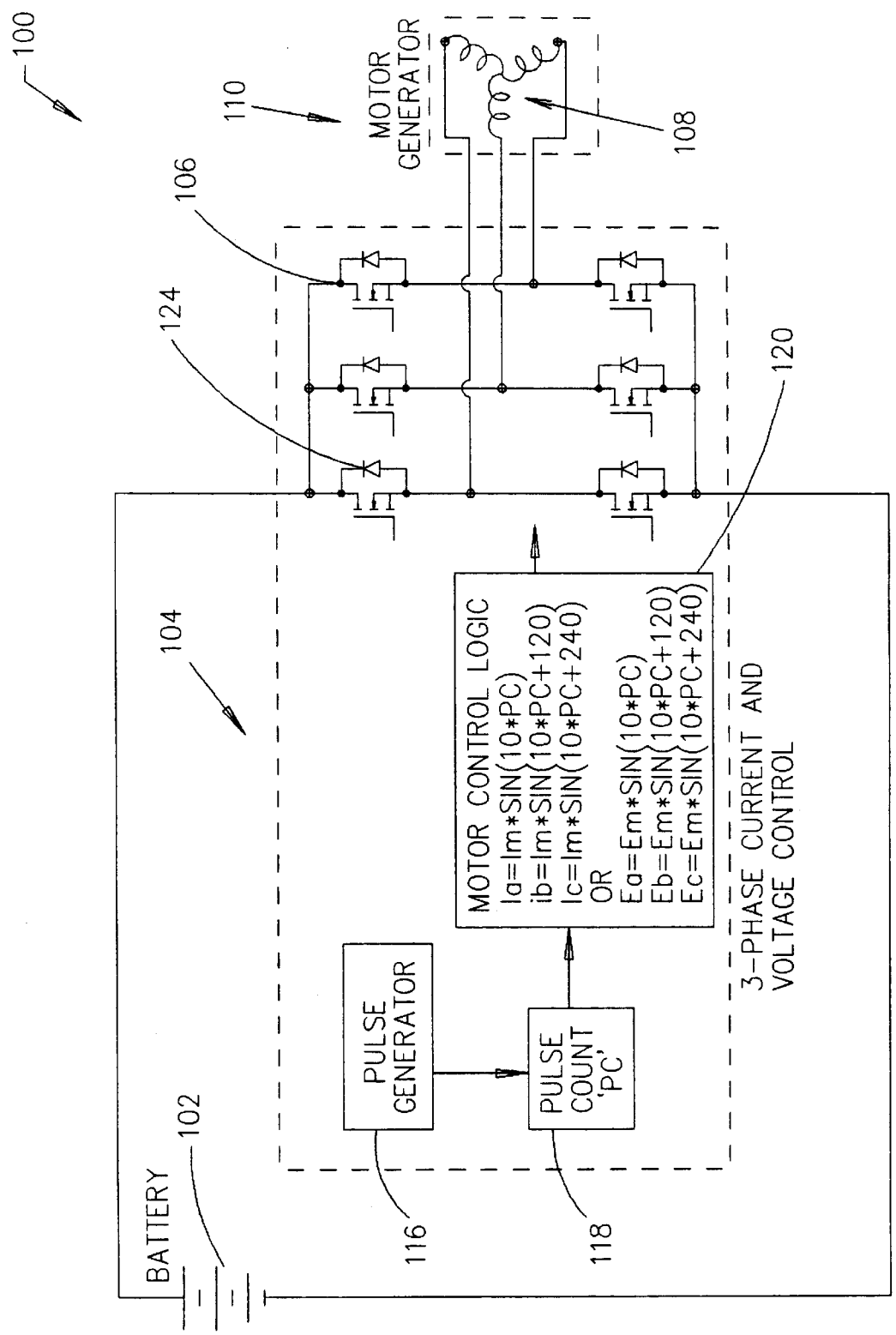
FIG. 1 shows a block diagram of a motor system of this invention.

A device according to one embodiment of the invention may use a form of flux vector control of a permanent magnet synchronous AC motor to develop full rated torque from zero rotational speed up to full rated speed. A motor-generator according to the invention may be used, for example, as a starter for aircraft engines and as a power generator for the aircraft.

The flux vector mode of operation or control of the motor of this invention enables the motor system to substantially lock the rotor magnetic field and the stator armature magnetic field together at zero rotational speed, and to develop full rated torque from zero speed up to full rated operating rotational speed.

This invention also provides means to selectively change from the flux vector control mode of operation to a 'volts per HZ' mode of operation at some selected speed to enable the motor to operate at substantially a 1.0 power factor with minimum 'amps per unit torque'.

In the 'volts per HZ' mode of operation, the algorithm of the motor control logic of this invention determines the phase relationship between the AC voltage and the AC current at the terminals of the motor windings and adjusts the applied voltage to the motor as required to bring the current and voltage AC waves into the same phase relationship with each other.

The condition wherein the current and the voltage AC waves are in phase with each other is, by definition, substantially 1.0 power factor, and the magnitude of electric current is at substantially the minimum for the torque condition.

In the generator mode of operation of the motor-generator system of this invention, the electronic power switches of the motor mode of operation are operated as synchronous rectifiers' to minimize the power loss inherent in diode rectification of AC power to DC power.

A motor with a polyphase armature winding and either a permanent magnet rotor or an electro-magnetically excited rotor can perform as a synchronous AC motor when the stator armature windings are excited by polyphase AC current. The rotational speed of the synchronous AC motor is determined by:

$$N=120*F/P$$

where:
N=RPM
F=AC Frequency (cycles/second or HZ)
P=Number of magnetic poles.

There are favorable advantages to operating a motor having a polyphase armature winding and a permanent magnet rotor as a synchronous AC motor instead of as a BLDC motor.

The rotational speed can be controlled as a function of controllably variable AC frequency power.

There is no 'rotor slip' loss as in an AC induction motor.
There are substantially no torque pulsations as in a BLDC motor.
The rotor magnetic field automatically assumes the optimum torque angle with respect to the stator armature magnetic field as a function of load.
The motor is not limited to a maximum rotational speed determined by the applied voltage as is a BLDC motor.
The operating power factor can be adjusted for minimum amps per unit torque. The one major problem encountered in previous operation of AC synchronous motors is that AC synchronous motors inherently have little or no starting or 'pull-up' torque.

Even at low AC frequencies where the stator armature magnetic field is rotating at low speeds, the rotor inertia may prevent the rotor, with external load, from coming up to speed fast enough to lock the rotor magnetic poles with the aiding armature magnetic poles before opposing armature magnetic poles overtake the rotor poles and exert a reversing torque on the rotor.

The present invention allows the motor-generator to operate as an AC synchronous motor that is capable of developing full rated motor torque from zero rotational speed up to maximum operational rotating speed.

For the purposes of simplicity in the following disclosure, the motor of this disclosure is presumed to be a 6-pole AC motor with a permanent magnet rotor and with a 3-phase winding in the motor stator. However, it is noted that the invention does not limit the motor to such characteristics.

The instantaneous magnitude of a sine wave of electric current can be defined by the equation:

$$I=Im*\sin(2*pi*F*t),$$

where $(2*pi*F*t)$ is the electrical angle in radians, or by the equation:

$$I=Im*\sin(360*F*t),$$

where: $(360*F*t)$ is the electrical angle in degrees.
In the preceding equations:

$Im$=Maximum magnitude of electric current (selectively preset), $F$=frequency (HZ), and $t$=time (seconds).

The relationship of the three phase currents in a 3-phase AC motor wherein the phases are labeled 'a', 'b', and 'c,' is:

$$Ia=Im*\sin(360*F*t)$$

$$Ib=Im*\sin((360*F*t)+120)$$

$$Ic=Im*\sin((360*F*t)+240)$$

The motor control section of the control system includes a 3-phase current and voltage controller with a 'pulse' generator function and a 'pulse count' function 'PC'.

For the purpose of describing the operation of the invention, the algorithm of an exemplary 3-phase current and voltage controller of this disclosure considers each pulse generated by the pulse generator function as representing 10 electrical degrees.

It is understood, however, that the pulses may be generated more or less frequently. The pulse generator function output is controllably varied from zero pulses per second to some maximum pulses per second representing the maximum rotational speed of the motor in the operating algorithm of the 3-phase current and voltage controller of this disclosure.

In the algorithm of the exemplary 3-phase current and voltage controller of this invention, the previously defined:

$$I=Im*\sin(360*F*t)$$

is replaced by:

$$I=Im*\sin(10*PC),$$

and the previous definition of the relationship of 3-phase motor currents:

$$Ia=Im*\sin(360*F*t)$$

$$Ib=Im*\sin((360*F*t)+120)$$

$$Ic=Im*\sin((360*F*t)+240)$$

is replaced by:

$$Ia=Im*\sin(10*PC)$$

$$Ib=Im*\sin((10*PC)+120)$$

$$Ic=Im*\sin((10*PC)+240)$$

The operational algorithm of the 3-phase current and voltage controller causes the pulse generator function to generate one pulse when the system is first turned 'on'. The resultant currents in the three phases of the exemplary motor of this disclosure are:

$$Ia=Im*\sin(10*1)=Im*\sin 10=+0.174*Im$$

$$Ib=Im*\sin(10*1+120)=Im*\sin 130=+0.766*Im$$

$$Ic=Im*\sin(10*1+240)=Im*\sin 250=-0.940*Im$$

The 3-phase current and voltage controller of this disclosure maintains the preceding magnitudes of electric current in the three phase windings of the motor until the pulse count function receives a second pulse from the pulse generator function.

After the second pulse is received by the pulse counter function PC, the 3-phase currents are maintained at:

$$Ia=Im*\sin(10*2)=Im*\sin 20=+0.342*Im$$

$$Ib=Im*\sin(10*2+120)=Im*\sin 140=+0.643*Im$$

$$Ic=Im*\sin(10*2+240)=Im*\sin 260=-0.985*Im$$

until a third pulse is received by the pulse counter, after which the current magnitudes become:

$$Ia=Im*\sin(10*3)=Im*\sin 30=+0.500*Im$$

$$Ib=Im*\sin(10*3+120)=Im*\sin 150=+0.500*Im$$

$$Ic=Im*\sin(10*3+240)=Im*\sin 270=-1.000*Im$$

This process continues pulse by pulse until the motor rotor has rotated through 360 electrical degrees. The pulse count PC function in the 3-phase current and voltage controller of this disclosure is reset to '1' each time the next bit following the bit representing 360 electrical degrees of rotation is received, and the process repeats itself. This mode of operation is referred to as the flux vector control mode.

In the operation of one embodiment of a 3-phase current and voltage controller, the amplifier algorithm controls the pulse generator function to generate pulses at a controlled increasing rate after a brief pause after the first 'on' pulse. The brief pause between the first pulse and the second pulse allows the motor rotor magnetic field to become properly aligned and locked in with the stator armature magnetic field.

A 6-pole motor requires 36 pulses for 360 electrical degrees of rotation and requires 6/2*36=108 pulses for each 360 mechanical degrees of rotation.

The maximum pulse rate of the pulse generator can be preset to cause the motor of this invention to operate at a design rotational speed.

At a preselected rate of pulses per second from the pulse generator, the operating algorithm of the 3-phase current and voltage controller switches from the flux vector control mode to a volts-per-Hz mode, changing the preceding:

$$Ia=Im*\sin(10*PC)$$

$$Ib=Im*\sin((10*PC)+120)$$

$$Ic=Im*\sin((10*PC)+240)$$

to:

$$Ea=Em*\sin(10*PC)$$

$$Eb=Em*\sin((10*PC)+120)$$

$$Ec=Em*\sin((10*PC)+240),$$

where Em represents a varying maximum magnitude of voltage, varying as a function of the pulses per second generated by the pulse generator. Thus, the controller controls the voltage rather than the current.

This change facilitates operation of the motor as a synchronous AC motor wherein the applied Em varied as a function of pulses per second ('volts per HZ'), can be further varied as needed to ensure motor operation at or near 1.0 power factor for minimum current per unit of torque.

In the following, the term 'internal component of applied voltage' refers to the component of the applied terminal voltage minus the armature winding internal voltage drop due to current in the armature winding.

A synchronous AC motor that is 'under excited' (the motor back electromotive force (BEMF) is less than the internal component of applied voltage) draws a reactive lagging current (the current lags behind the voltage). A synchronous AC motor that is 'over excited' (the motor BEMF is higher than the internal component of applied voltage) draws a reactive leading component of current (the current leads the voltage). A synchronous AC motor that is 'correctly excited' (the motor BEMF is the same as the internal component of applied voltage) operates at substantially 1.0 power factor with the current in phase with the voltage. The total current drawn by a synchronous AC motor is at a minimum when the motor is operating at substantially 1.0 power factor.

The operating algorithm of the 3-phase current and voltage controller includes a function that determines the phase relationship of the AC motor current with that of the applied AC voltage.

Additionally, the operating algorithm determines whether the AC current wave is leading or lagging that of the AC voltage wave, and further adjusts the magnitude of the 3-phase voltage, Em, (varying as a function of 'pulses per second') as required to bring the current and voltage wave forms substantially in phase.

In the flux vector control mode of operation, the motor develops a constant rated torque with a constant Im and a consequent increasing 3-phase AC voltage applied to the terminals of the motor as the rotational speed increases from zero speed up to the preset 'transition' speed.

In the volts per HZ mode of operation, the motor develops a constant rated.torque with a constant minimized Im and an Em increasing as the pulses per second from the pulse generator increases. The magnitude of Em is further adjusted to keep the AC current wave in phase with the AC voltage wave.

In a motor-generator and 3-phase current and voltage controller system designed for optimum performance, the motor is designed so that the required AC voltage input from the 3-phase current and voltage controller when the motor is operating at rated horsepower and rotational speed at substantially 1.0 power factor is preferably the maximum AC voltage that can be derived from the available DC power supply.

For rotational speeds in excess of the rated continuous duty operating speed of the system at the maximum available AC voltage input, the pulse generator function of the 3-phase current and voltage controller is commanded to generate pulses at an increased rate to cause the motor to rotate at rotational speeds in excess of the rated operating rotational speed of the system.

At the increased rotational speeds, the motor performs as an 'overexcited' synchronous motor (the motor BEMF is greater than the internal component of applied voltage) operating in a volts per HZ mode of operation wherein the volts (Em) is at a maximum and can not increase. The motor draws a leading reactive current as the HZ increase with a constant Em.

The magnitude of the lead and the consequent magnitude of the leading component of current increases as the commanded rotational speed of the motor increases above its designed continuous duty operating rotational speed. The motor will operate with an increasing Im and a constant Em up to higher speeds limited only by the maximum Im capability of the system.

No special field weakening control system or special power electronics is required for the motor-generator of this invention to operate at overspeed, in contrast to the typical BLDC motor systems currently in use.

The preferred motoring mode power electronics of the motor-generator incorporates 6 sets of multiple 'field effect transistors' (FETs) and 'flyback' diodes arranged in the typical manner used in conventional prior art DC to AC inverters and in prior art BLDC motor systems.

The flyback diodes in the circuitry of the 3-phase current and voltage controller automatically act as a 3-phase full wave diode bridge rectifier to provide DC output power when the motor is driven as a generator.

A 3-phase diode bridge rectifier typically has a forward voltage drop ranging between 2 VDC to 3 VDC. In a 300-amp DC system, the rectification losses range between 600 watts and 900 watts, with 750 watts of loss being typical.

The FETs used in the 3-phase current and voltage controller are bipolar devices. They can conduct electric current in either direction when in the 'on' condition. The voltage drop through a properly designed set of FETs conducting in parallel can be typically as low as 0.3 VDC.

In the motoring mode of operation of the motor-generator system, the FETs will be turned 'on' at the proper time and in the proper sequence to operate the exemplary motor as a motor in either the flux vector control mode or the volts per HZ mode of operation.

The proper timing and sequencing of the motoring mode is substantially controlled as previously described.

In the generator mode of operation, the FETs are turned 'on' at the proper time and in the proper sequence to conduct in parallel with the conducting diodes of the 3-phase current and voltage controller acting as a 3-phase full wave bridge rectifier.

As an example, in a 300-amp DC system, the rectification losses of between 600 watts to 900 watts in a conventional prior art diode bridge rectifier are reduced to between 60 watts and 90 watts in the bridge rectifier according to the invention wherein the FETs are programmed to conduct in parallel with the conducting diodes.

FIG. 1 shows a block diagram of the apparatus and functions of a motor system 100 according to the invention. A battery 102 is connected to a 3-phase current and voltage controller 104. The 3-phase current and voltage controller 104 includes field effect transistors (FETs) 106 that are connected to 3-phase armature windings 108 of a motor-generator 110.

The 3-phase current and voltage controller 104 includes a pulse generator 116 connected to a pulse count module 118. The output from the pulse count module 118 is input to a motor control logic module 120.

During the flux vector control mode of operation, the motor control logic module 120 controls the on-off-on switching of the FETs 106 to provide electric current to the armature windings 108 of the motor-generator 110 in accordance with the following algorithm:

$$Ia=Im*\sin(10*PC)$$

$$Ib=Im*\sin((10*PC)+120)$$

$$Ic=Im*\sin((10*PC)+240)$$

where Ia=the electric current in the phase A windings of the 3-phase armature windings 108 of the motor-generator 110, Ib=the electric current in the phase B windings and Ic=the electric current in the phase C windings of the 3-phase armature windings 108 of the motor-generator 110.

The magnitude or value of Im may be preset in the algorithm controlling the operation of the 3-phase current amplifier and logic module 120.

In operation, the pulse generator 116 is programmed to generate one pulse when the motor system 100 is first turned on. After a programmed pause, the pulse generator 116 generates a second pulse, and then succeeding pulses at either an externally controllable rate or at a preset increasing rate of pulses per second until the rate of pulses per second agrees with a reference pulse rate set for the desired operating rotational speed.

The pause after the first pulse allows time for the magnetic field of the rotor of the motor-generator 110 to align with and lock into the magnetic field in the stator armature windings 108 of the motor-generator 110.

The reference pulse rate per second can be a preset fixed value or can be selectively set at variable values or magnitudes as in the case of variable speed motor operation.

Further, in the case of a variable speed motor operation, the pulse rate per second can be decreased or increased at variable or preset rates of change.

The pulse count module 118 accumulates the sum of the pulses received from the pulse generator 116 and updates or forwards to the motor control logic module 120 the latest pulse count PC.

The magnitude of the electrical degrees represented by one pulse is preset to a value that depends on the parameters of operation for each application of the invention.

For the sake of simplicity and for description purposes, each pulse is set to represent 10 electrical degrees. The use of alternate or other values of electrical degrees per pulse does not alter, invalidate or affect the operation of the motor-generator system 100 of the invention.

The pulse count module 118 is programmed to reset to '1' when it receives the first next pulse after receiving and accumulating the number of pulses representing 360 electrical degrees of rotation.

At some pre-selected rotational speed of the motor rotor, the control algorithm of the 3-phase current and voltage controller 104 replaces the flux vector control mode of operation with a 'volts per HZ' mode of operation:

$$Ia=Im*\sin(10*PC)$$

$$Ib=Im*\sin((10*PC)+120)$$

$$Ic=Im*\sin((10*PC)+240)$$

is replaced with:

$$Ea=Em*\sin(10*PC))$$

$$Eb=Em*\sin((10*PC)+120)$$

$$Ec=Em*\sin((10*PC))+240)$$

The motor control logic module 120 maintains the magnitude of Em at a constant ratio with respect to the pulses per second generated by the pulse generator 116 so that the motor performs according to the relationship Em=c*k*HZ, where k is a preselected or preset constant determined by the performance characteristics of the motor of this invention and c is a variable controlled by the phase difference between the AC electric current and the AC voltage applied to the motor.

The motor control logic module 120 includes an electric current zero cross-over detection function to detect the zero cross-over point as the flow of the AC electric current changes direction in one of the phases of the 3-phase stator armature windings 108.

Additionally, the motor control logic module 120 includes a voltage zero cross-over detection function to detect the zero cross-over point of the applied AC voltage as the voltage changes polarity in the same phase as is detected for the electric current cross-over.

The operating algorithm of the motor control logic module 120 determines whether the electric current zero crossover occurs before or after the voltage zero cross-over.

The operating algorithm of the motor control logic module 120 further includes the logic to adjust the magnitude of c in the equation Em=c*k*HZ, as required, to cause the electric current zero cross-over to occur at substantially the same instant in time as does the zero cross-over of the voltage.

Causing the current and voltage zero cross-overs to occur at substantially the same time causes the motor to perform at substantially 1.0 power factor for substantially minimum current required for operation at any given magnitude of load torque.

The concept of motor operation at substantially 1.0 power factor will be further described in the description of the system operation relating to FIG. 5.

Figure 2:
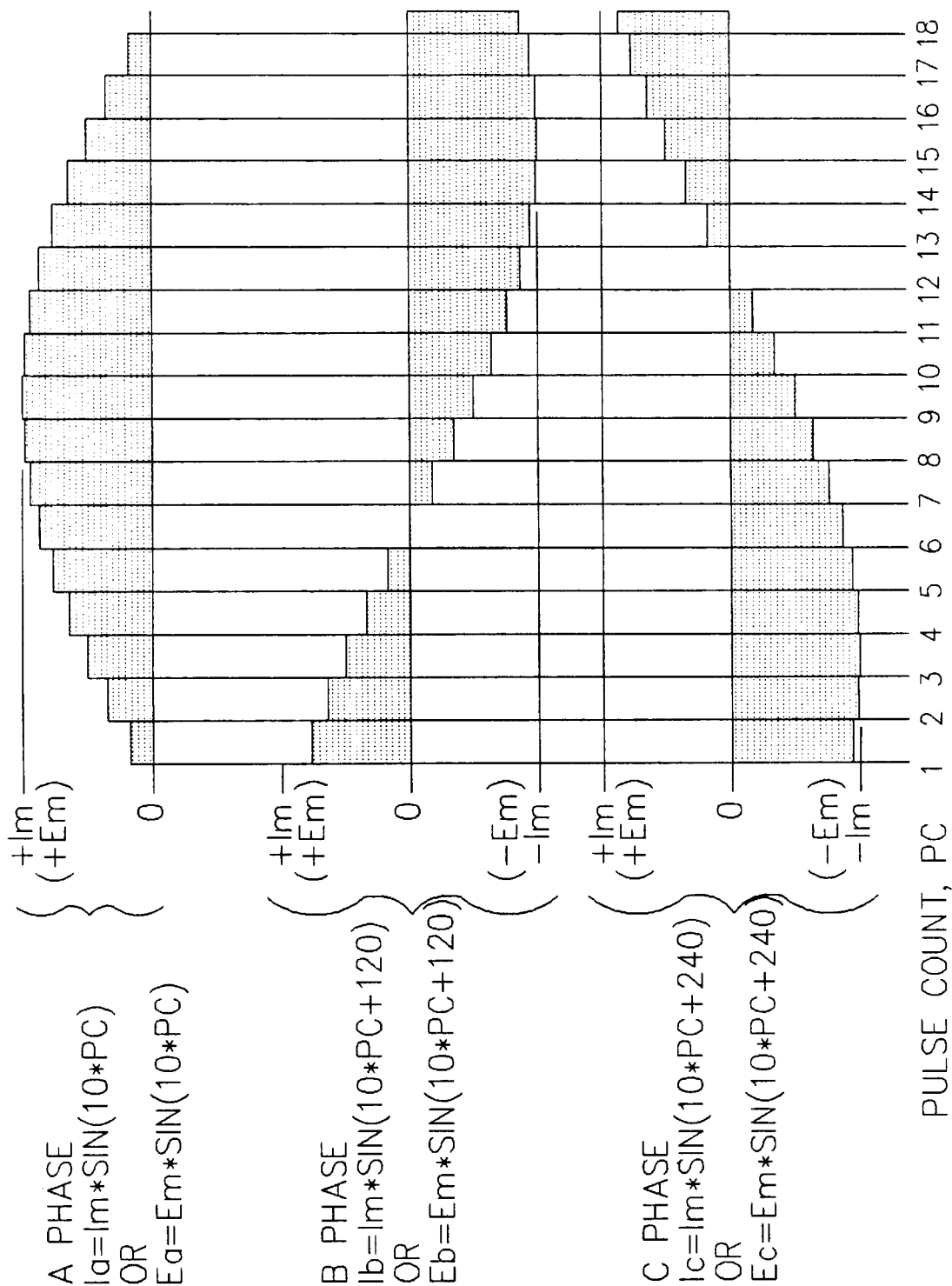
FIG. 2 shows the wave shape of each of the individual phases of the 3-phase electric current or voltage supplied by the current amplifier of this invention to the motor of this invention.

FIG. 2 shows the wave shape or form of 180 electrical degrees of the 3-phase current or voltage output from the 3-phase current and voltage controller 104 of FIG. 1. For description purposes, the pulses PC are depicted as occurring at a steady rate of pulses per second, as would be the case when the motor is operating at a constant or steady rotational speed.

Figure 3:
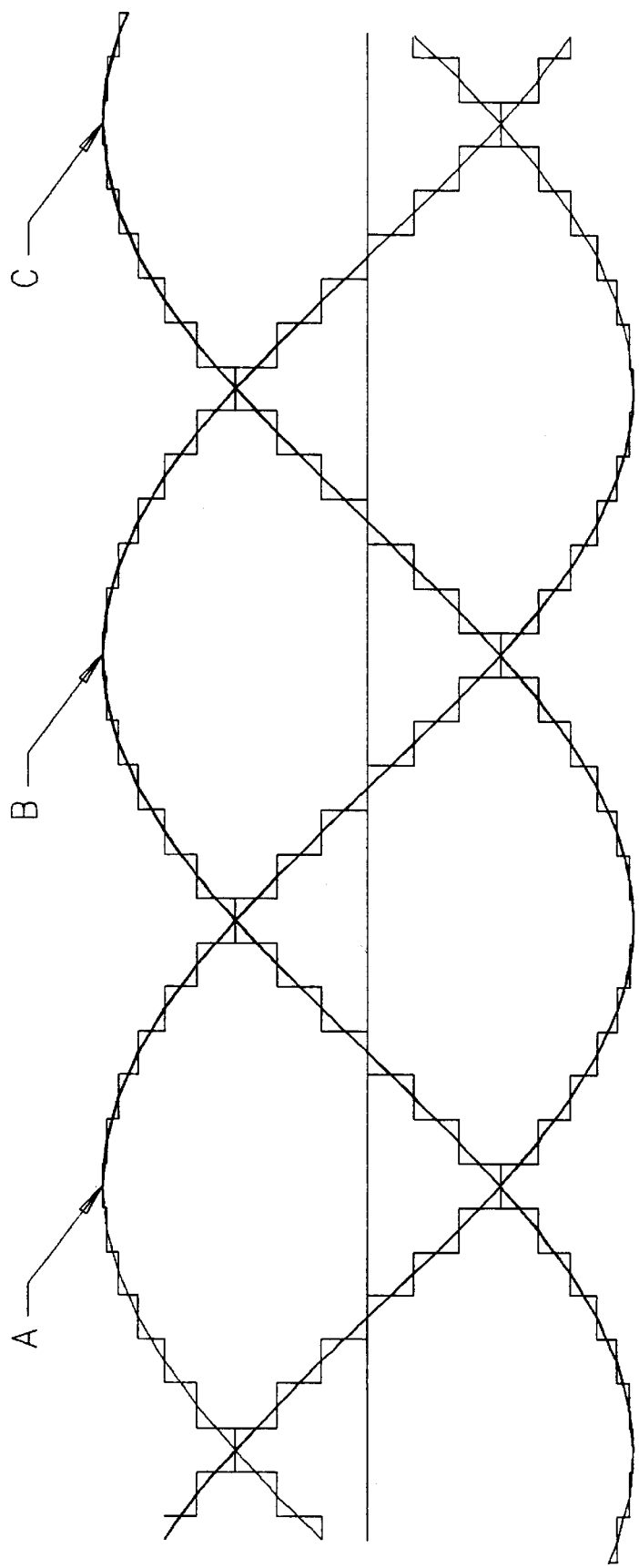
FIG. 3 shows the smoothed wave shape effect of filtering the 3-phase electric current or voltage supplied by the 3-phase current and voltage amplifier of this invention to the motor of this invention.

FIG. 3 shows the effective 3-phase sine wave of AC current derived from the action of the 3-phase current and voltage controller. The smooth sine waves superimposed over the steps in current or voltage created by the above-described operation show the effective current or voltage wave shape possible after filtering.

Figure 4:
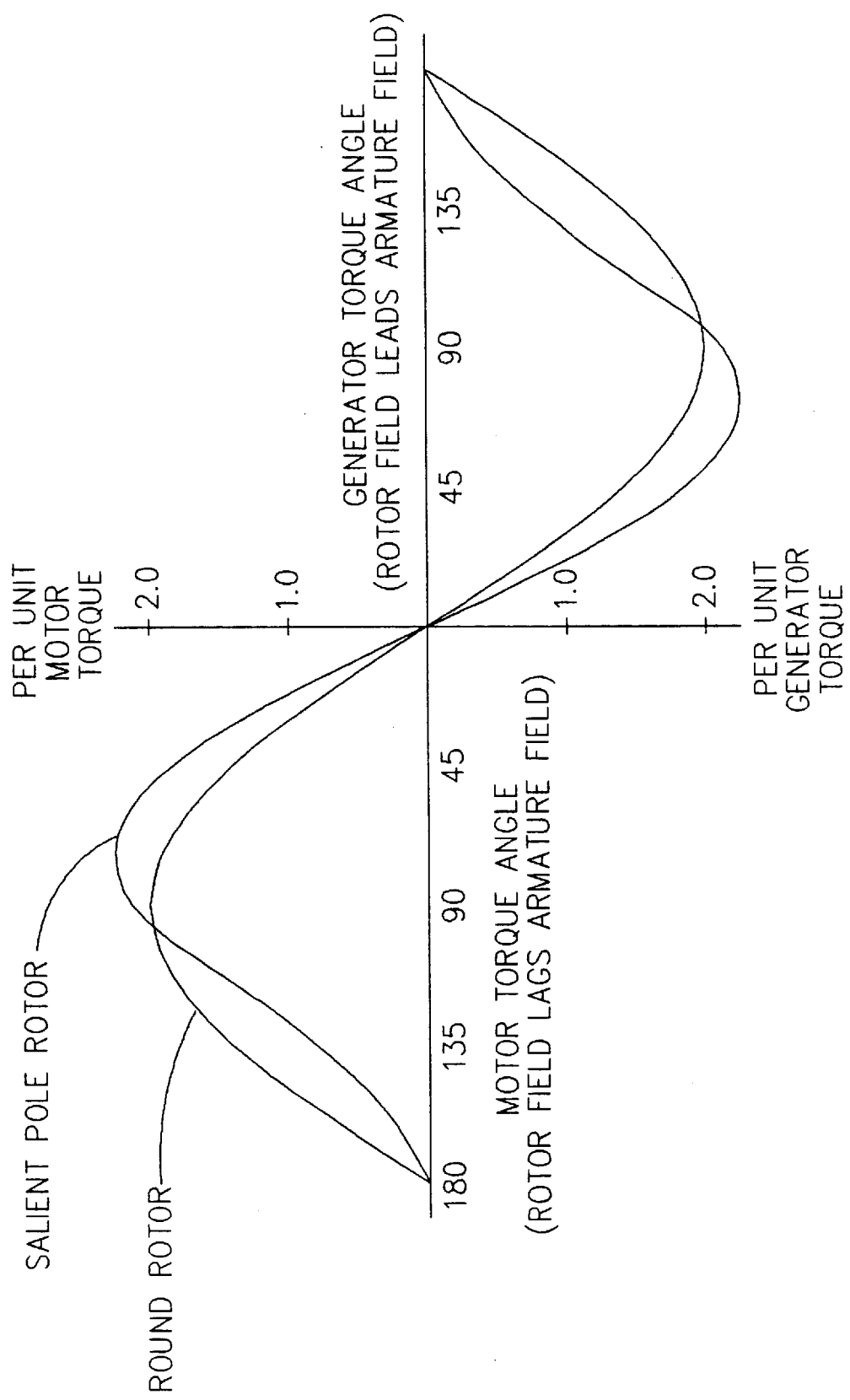
FIG. 4 is a graph of the torque angle of a synchronous AC motor-generator as a function of torque.

FIG. 4 shows the characteristic 'torque angle versus torque' of synchronous AC machines. A permanent magnet rotor is classified as a salient pole rotor.

The motor-generator 110 according to the invention operating in the 'volts per HZ' mode will substantially operate as, and have all of the characteristics of, a synchronous AC motor. The rotor of the motor of this disclosure will characteristically assume the optimum torque angle as a function of torque. In contrast, the rotor torque angle of a typical prior art BLDC motor is arbitrarily fixed at a constant magnitude by the placement of the rotor shaft position sensors.

Figure 5A:
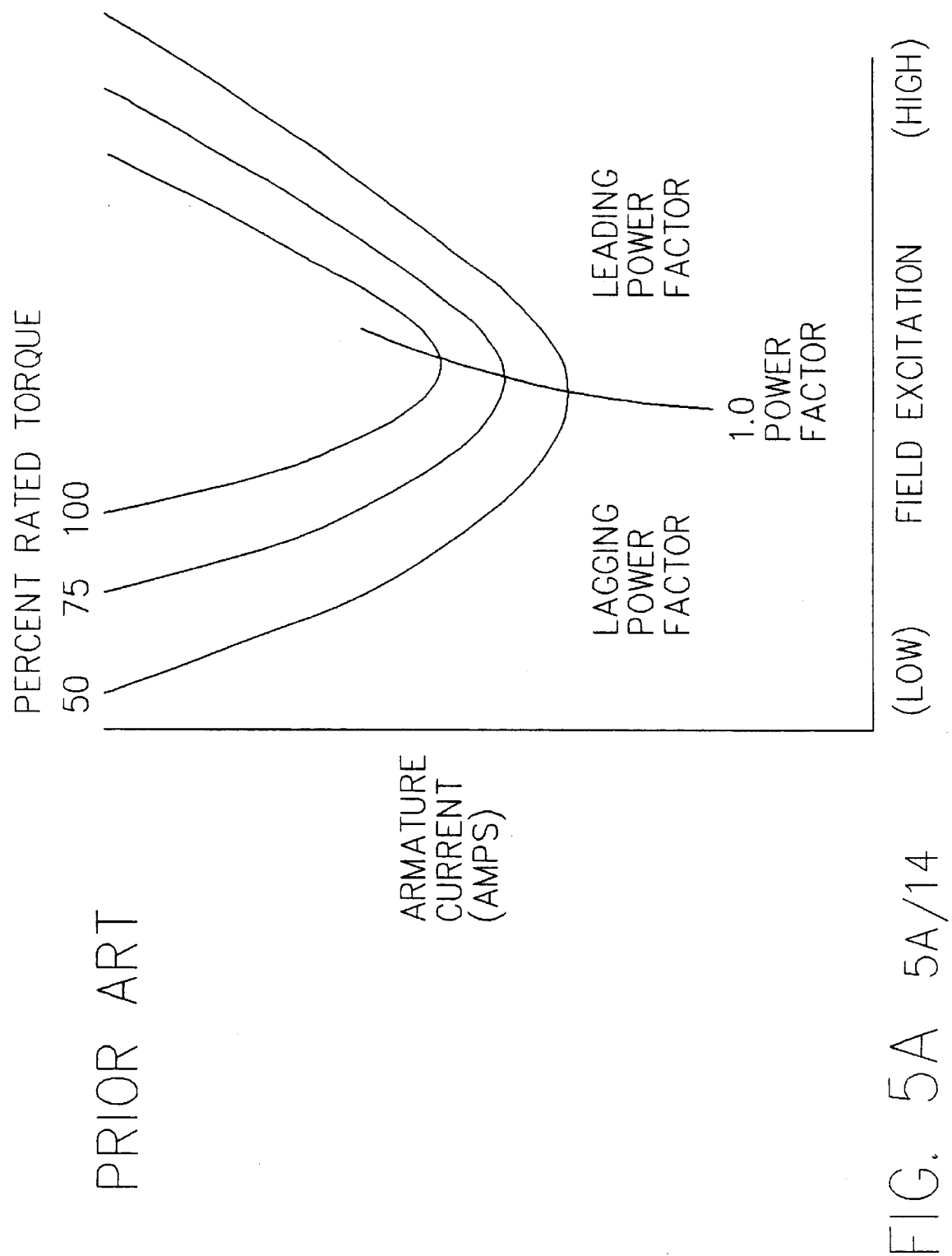
FIG. 5A is a graph showing the armature current of a synchronous AC motor at various loads as a function of the field excitation of the motor.

FIG. 5A shows the variation of armature current in synchronous AC motors for any given load as a function of the field excitation. The 1.0 power factor operating condition substantially occurs when the generated back electromotive force (BEMF) of the motor matches the previously defined internal component of externally applied terminal voltage. In the case of.electro-magnetically excited synchronous AC motors, the field excitation can be varied as needed so that the motor's generated BEMF matches the internal component of externally applied terminal voltage for optimum operation of the motor.

In the case of the permanent magnet synchronous AC machine of the present invention, the field excitation can substantially not be readily varied.

Figure 5B:
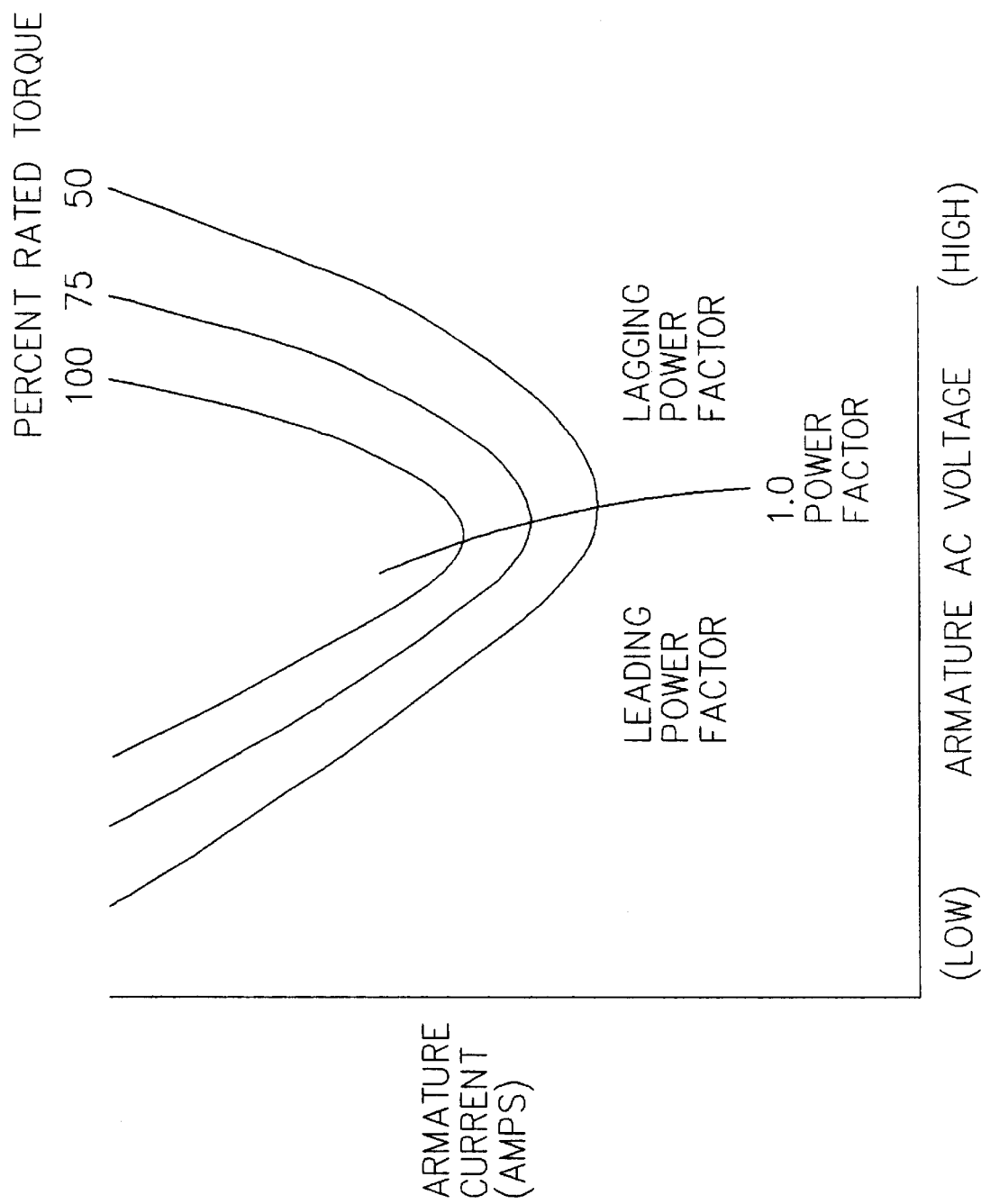
FIG. 5B is a graph showing the armature current of a permanent magnet synchronous motor as a function of armature voltage.

As an alternative, the terminal voltage applied from the 3-phase current and voltage controller function 104 to the stator armature windings 108 can be varied so that the internal component of externally applied terminal voltage matches the generated BEMF of the motor-generator assembly 110 during motoring operation. FIG. 5B illustrates the variation of armature current in the permanent magnet synchronous motor as a function of armature voltage.

For this end, the motor control logic function 120 may include an operation that senses and compares the 'zero-crossover' point of the AC current wave and the zero-crossover point of the AC voltage wave as first described in the preceding discussion of FIG. 1.

Further, the motor control logic function 120 may include an operation that varies the magnitude of c in Em=c*k*HZ for:

$$Ea=Em*\sin(10*PC))$$

$$Eb=Em*\sin((10*PC)))+120)$$

$$Ec=Em*\sin((10*PC)))+240),$$

where Em=c*k*HZ as disclosed above with reference to FIG. 1.

By definition, the motor is operating at substantially 1.0 power factor when both the AC current and the AC voltage zero-crossovers occur at substantially the same time.

Figure 6:
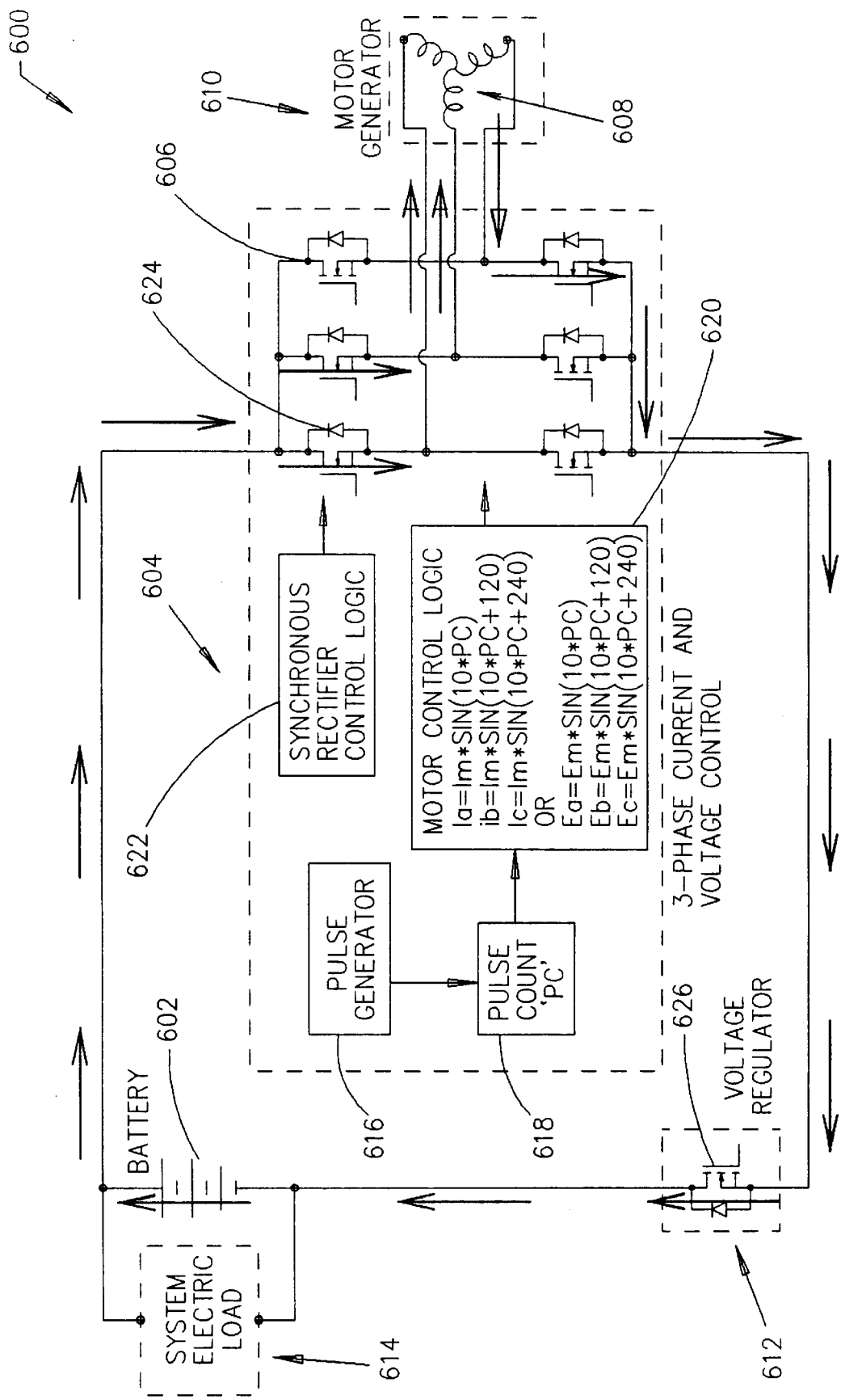
FIG. 6 shows the path and direction of the electric current flow in the motor-generator of this invention operating as a motor.

FIG. 6 shows a block diagram of the apparatus and functions of an embodiment of a motor-generator system 600 according to the invention. A battery 602 is connected to a 3-phase current and voltage controller function 604. The 3-phase current and voltage controller function 604 includes field effect transistors (FETs) 606 that are connected to 3-phase armature windings 608 of a motor-generator 610. A system electric load 614 is connected in parallel with the battery 602. A Pulse Width Modulator (PWM) voltage regulator 612 having FETs 626 is connected in series with the 3-phase current and voltage controller function 604 and the battery 602 in parallel with the electric system load 614.

FIG. 6 further shows the path for the flow of electric current when the motor-generator system 600 is operating as a motor. The voltage regulator 612 is in the 'on' condition, so that the current is flowing in the reverse direction through the 'on' FETs 626 for minimum electric loss through the voltage regulator in the motoring mode of operation.

Figure 7:
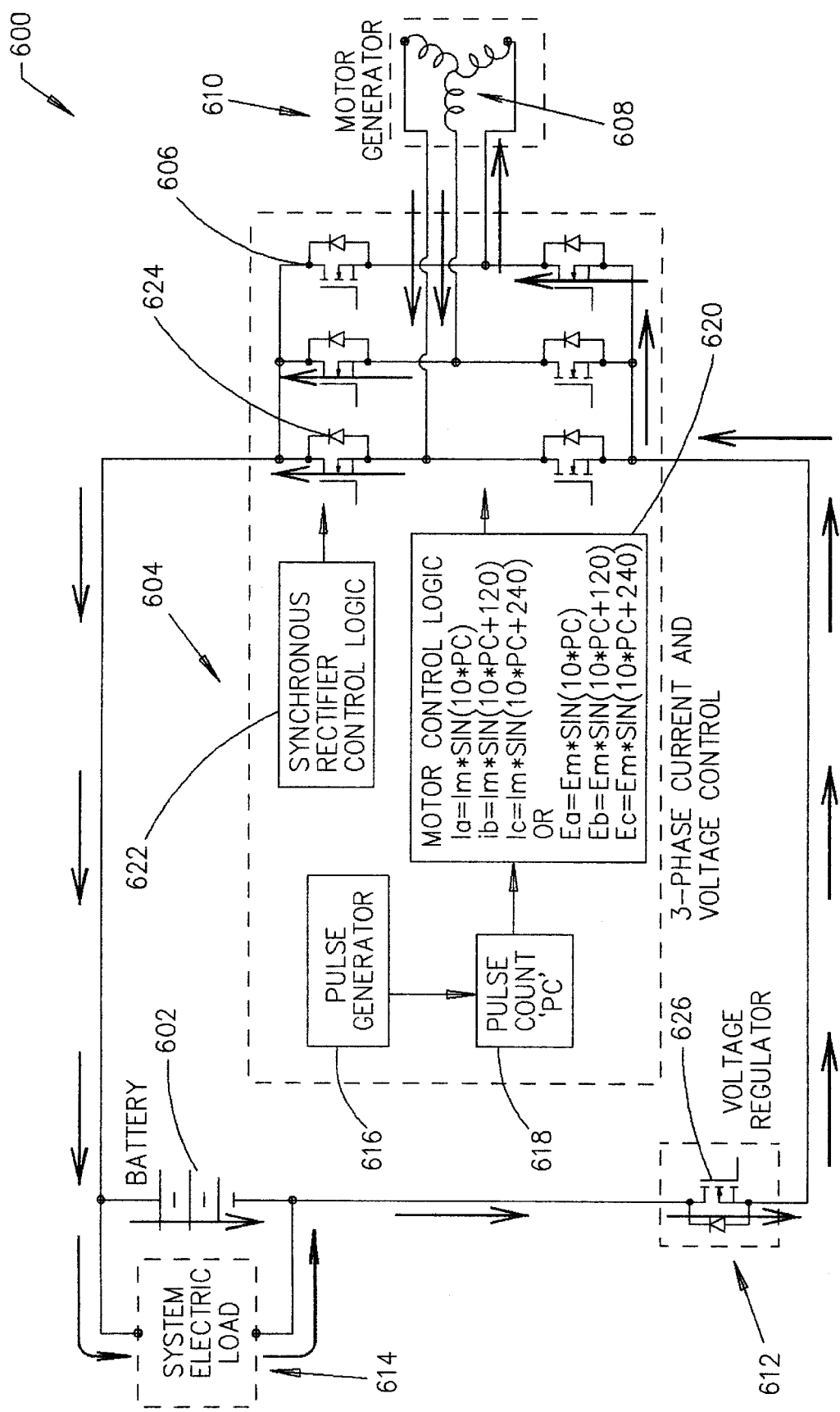
FIG. 7 shows the synchronous rectifier function and the path and direction of the electric current flow in the motor-generator of this invention operating as a generator.

FIG. 7 shows the path for the flow of electric current when the motor-generator system 600 of FIG. 6 is operating as a generator. The voltage regulator 612 is in the 'on' condition, and the current is flowing in the forward direction through the FETs 626. The system generated DC voltage output is regulated by the PWM action of the voltage regulator 612.

The voltage regulator 612 is set or adjusted to begin its PWM off-on-off operation whenever the DC voltage exceeds the preset regulated generator output voltage of the motor-generator system 600, which substantially only occurs when the motor-generator system 600 is operating as a generator. The result is a substantially automatic transition from the motoring mode of operation to the generating mode of operation.

During the generator mode of operation of motor-generator system 600, the rectifier control logic 622 senses either the zero-crossover of the voltage of the AC sine wave, or the presence or the polarity of a forward voltage drop across the flyback diodes 624. The rectifier control logic 622 turns 'on' the appropriate FETs 606 so that the electric current from armature windings 608 of the motor-generator system 600 can flow in the backwards direction through the FETs 606 for minimum rectification power losses.

Figure 8:
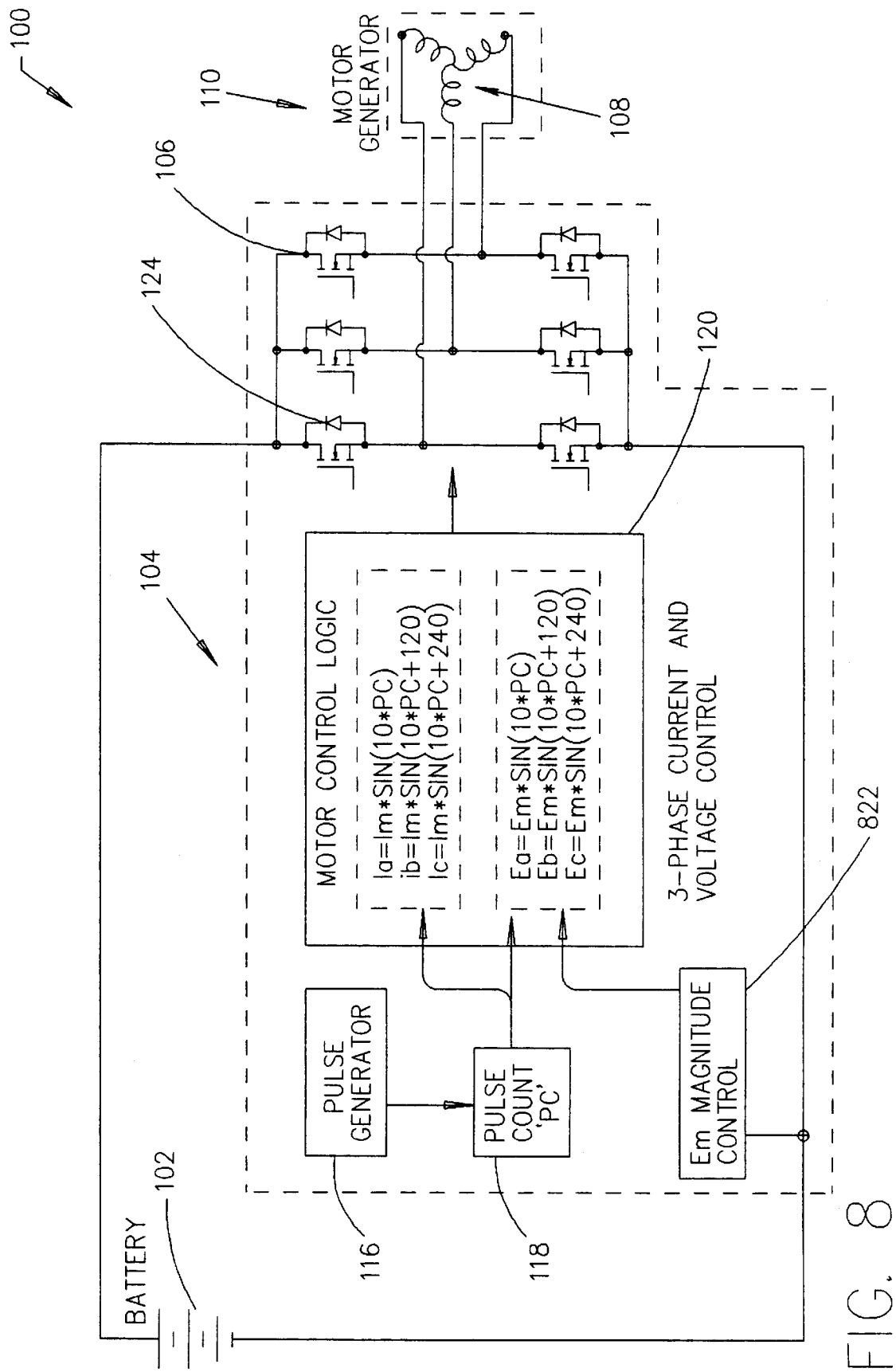
FIG. 8 is a block diagram illustrating one embodiment of a motor system according to the invention with one embodiment of a voltage control system.
Figure 9:
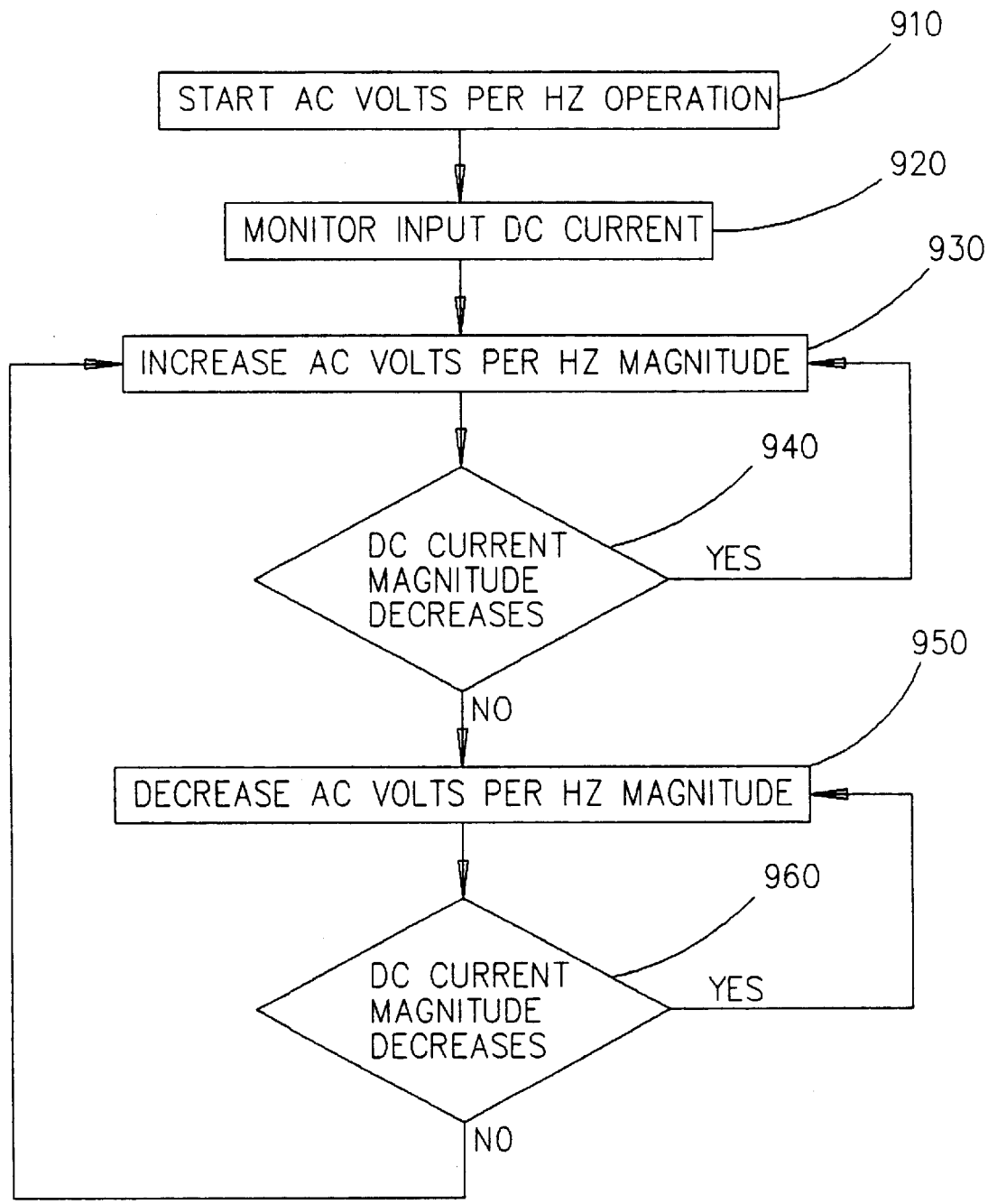
FIG. 9 is a flow chart illustrating the operation of the voltage control system of FIG. 8.

FIGS. 8 and 9 illustrate one embodiment of the invention with a voltage magnitude control module 822. As illustrated in FIG. 8, the voltage magnitude control module monitors the DC input current and the AC voltage applied to the armature windings of the motor. Based on the monitored DC input current magnitude, the voltage magnitude control module 822 instructs the motor control logic module 120 to adjust the voltage magnitude, Em, according to the algorithm, for example, shown in FIG. 9.

Referring now to FIG. 9, the algorithm for adjustment of the voltage magnitude, Em, based on monitoring of the input DC current is shown. At block 920, the voltage magnitude control module 822 monitors the input DC current. At block 930, the voltage magnitude control module 822 instructs the motor control logic module 120 to increase the magnitude of the AC volts per Hz by a predetermined amount.

At block 940, the effect of the increase of block 930 is determined. If the increase in AC volts per Hz results in a decrease in the monitored DC current magnitude, the algorithm returns to block 930, and the voltage magnitude control module 822 instructs the motor control logic module 120 to further increase the AC volts per Hz magnitude. If, on the other hand, the increase in AC volts per Hz magnitude in block 930 does not result in a decrease in the DC current magnitude, the algorithm proceeds to block 950.

At block 950, the voltage magnitude control module 822 instructs the motor control logic module 120 to decrease the magnitude of the AC volts per Hz by a predetermined amount. At block 960, the effect of the decrease of block 950 is determined. If the decrease in AC volts per Hz results in a decrease in the monitored DC current magnitude, the algorithm returns to block 950, and the voltage magnitude control module 822 instructs the motor control logic module 120 to further decrease the AC volts per Hz magnitude. If, on the other hand, the decrease in AC volts per Hz magnitude in block 950 does not result in a decrease in the DC current magnitude, the algorithm returns to block 930, and the voltage magnitude control module 822 instructs the motor control logic module 120 to increase the AC volts per Hz magnitude.

Thus, the voltage magnitude control module constantly monitors the DC input current and adjusts the AC volts per Hz magnitude to maintain a minimum DC input current.

Figure 10:
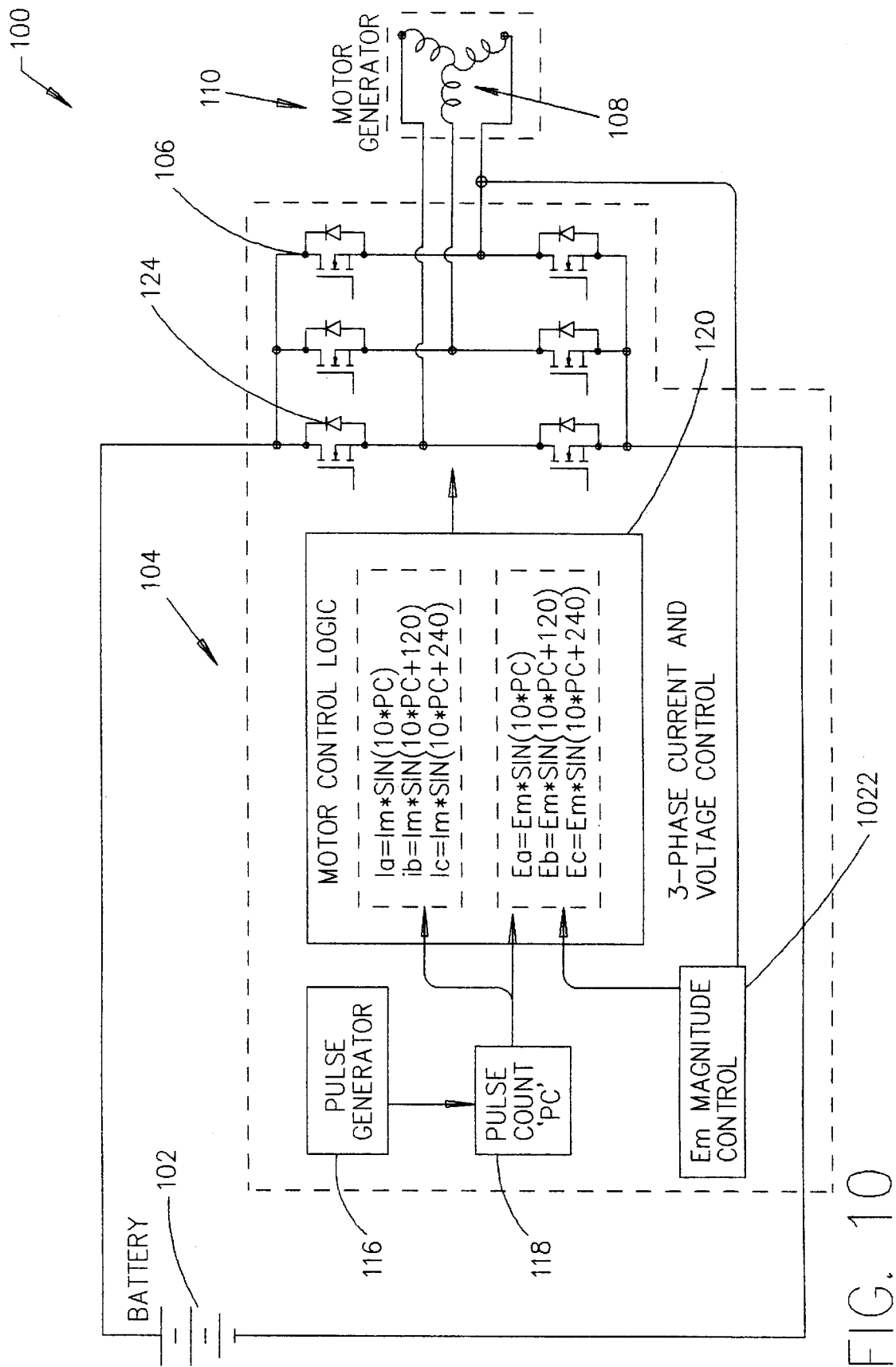
FIG. 10 is a block diagram illustrating one embodiment of a motor system according to the invention with another embodiment of a voltage control system.
Figure 11:
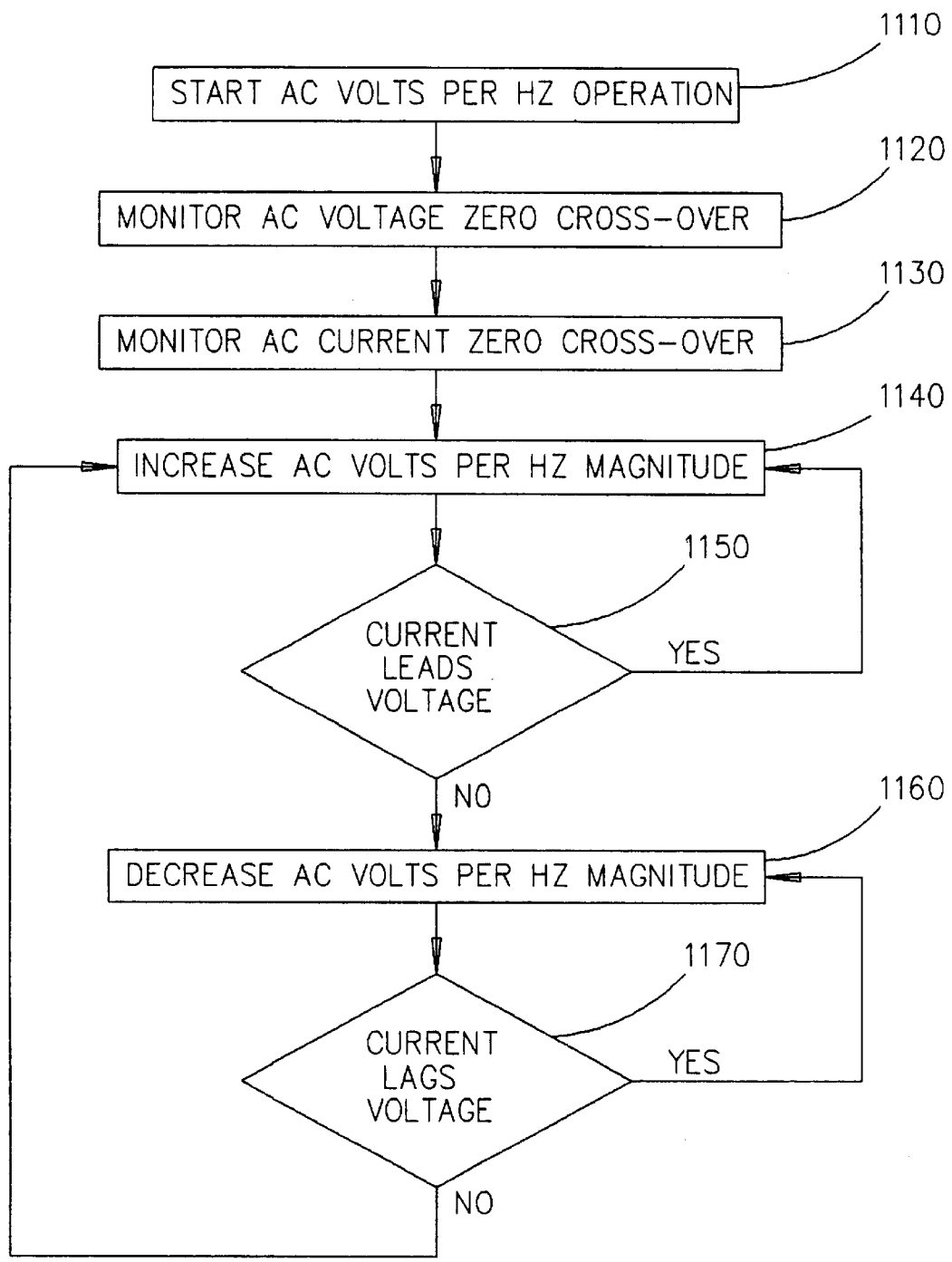
FIG. 11 is a flow chart illustrating the operation of the voltage control system of FIG. 10.

FIGS. 10 and 11 illustrate another embodiment of the invention with another voltage magnitude control module 1022. The voltage magnitude control module 1022 illustrated in FIG. 10 monitors the phase relationship of the motor AC current with respect to the AC voltage applied to the motor armature windings. Based on the monitored phase relationship, the voltage magnitude control module 1022 instructs the motor control logic module 120 to adjust the voltage magnitude, Em, according to the algorithm, for example, shown in FIG. 11.

Referring now to FIG. 11, the algorithm for adjustment of the voltage magnitude, Em, based on monitoring the phase relationship of the motor AC current with respect to the applied AC voltage is shown. At block 1120, the voltage magnitude control module 1022 monitors the AC voltage zero cross-over and, at block 1130, monitors the AC current zero cross-over.

At block 1140, the voltage magnitude control module 1022 instructs the motor control logic module 120 to increase the AC volts per Hz magnitude by a predetermined amount. At block 1150, the voltage magnitude control module 1022 examines the phase relationship of the monitored AC current with respect to the monitored AC voltage and determines whether the current leads the voltage. If the voltage magnitude control module 1022 determines that current leads voltage, the algorithm returns to block 1140, further increasing the AC volts per Hz magnitude.

If, on the other hand, the voltage magnitude control module 1022 determines that current does not lead voltage, the algorithm proceeds to block 1160. At block 1160, the voltage magnitude control module 1022 instructs the motor control logic module 120 to decrease the magnitude of the AC volts per Hz by a predetermined amount. The algorithm then proceeds to block 1170.

At block 1170, the voltage magnitude control module 1022 examines the phase relationship of the monitored AC current with respect to the monitored AC voltage and determines whether the current lags the voltage. If the voltage magnitude control module 1022 determines that current lags voltage, the algorithm returns to block 1160, further decreasing the AC volts per Hz magnitude. On the other hand, if the voltage magnitude control module 1022 determines that current does not lag voltage, the algorithm returns to block 1140, increasing the AC volts per Hz magnitude.

Thus, the voltage magnitude control module constantly monitors the phase relationship of the motor AC current with respect to the AC voltage applied to the motor armature windings, and adjusts the AC volts per Hz magnitude to maintain the voltage and current in phase, thereby minimizing the input DC current.

In another embodiment, a look-up table or a constant may be first developed to provide an optimal volts-per-Hz magnitude to maintain a power factor of substantially 1.0. For example, test equipment may be used to experimentally determine a magnitude of volts-per-Hz for different magnitudes of load torque on a particular motor system. The data may be provided into the operating algorithm in the form of a look-up table or a multiplicative constant. Thus, for a particular model of helicopter turbine having a characteristic magnitude of required starting torque that is a function of the turbine shaft speed, for example, during the engine starting cycle, the look-up table or the constant may be used to maintain a substantially 1.0 power factor. This procedure simplifies and reduces the cost of the control system by eliminating the need to reproduce the logic circuitry and sensors in each production system to sense the phase relationship.

Figure 12:
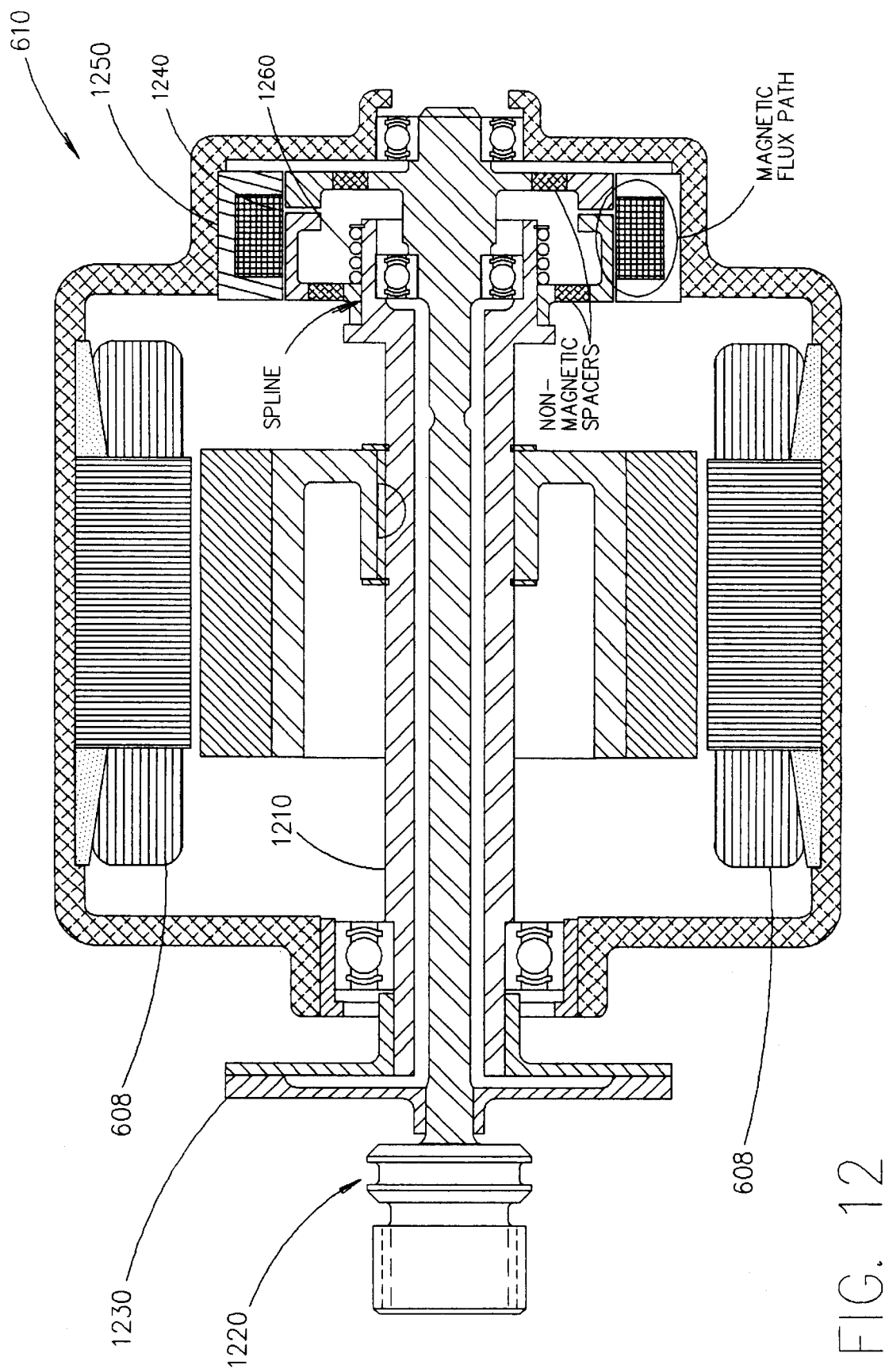
FIG. 12 is a cross-sectional view of one embodiment of a clutch assembly for a motor according to the present invention.
Figure 13:
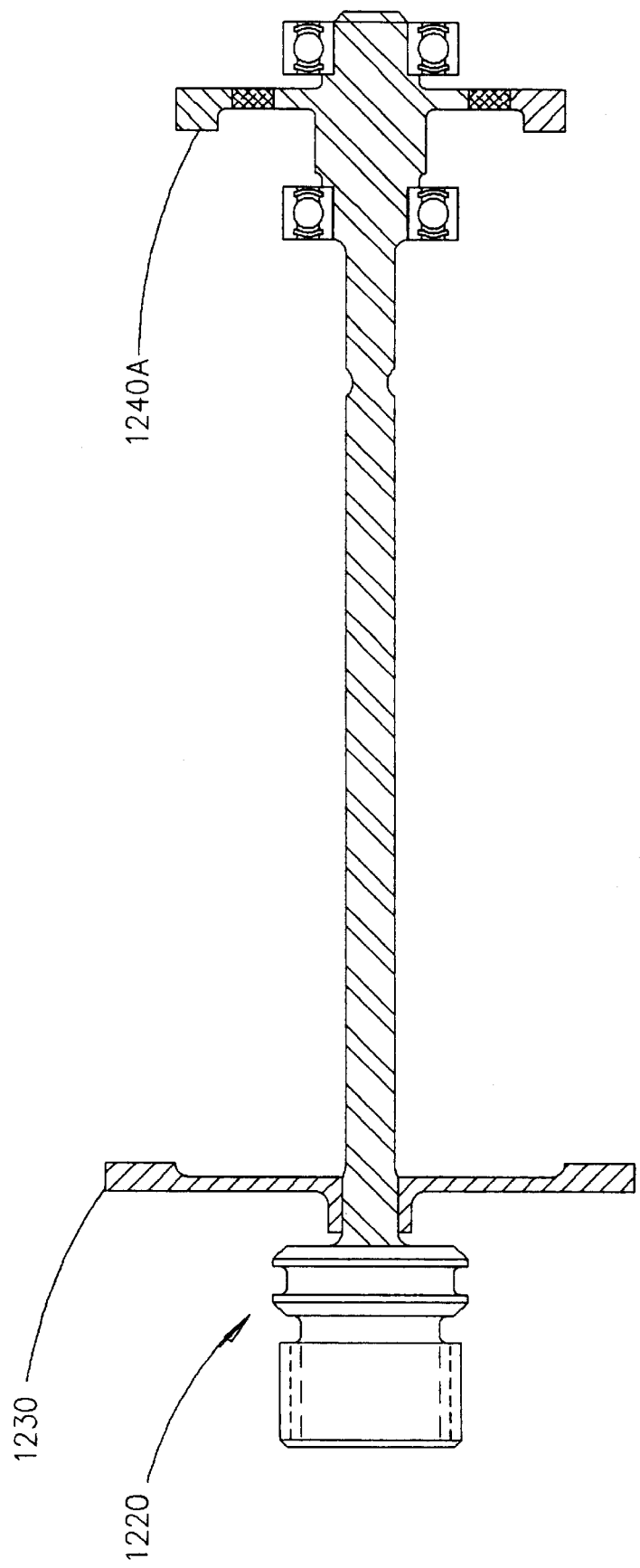
FIG. 13 is a cross-sectional view of a quill shaft of the clutch assembly of FIG. 8.
Figure 14:
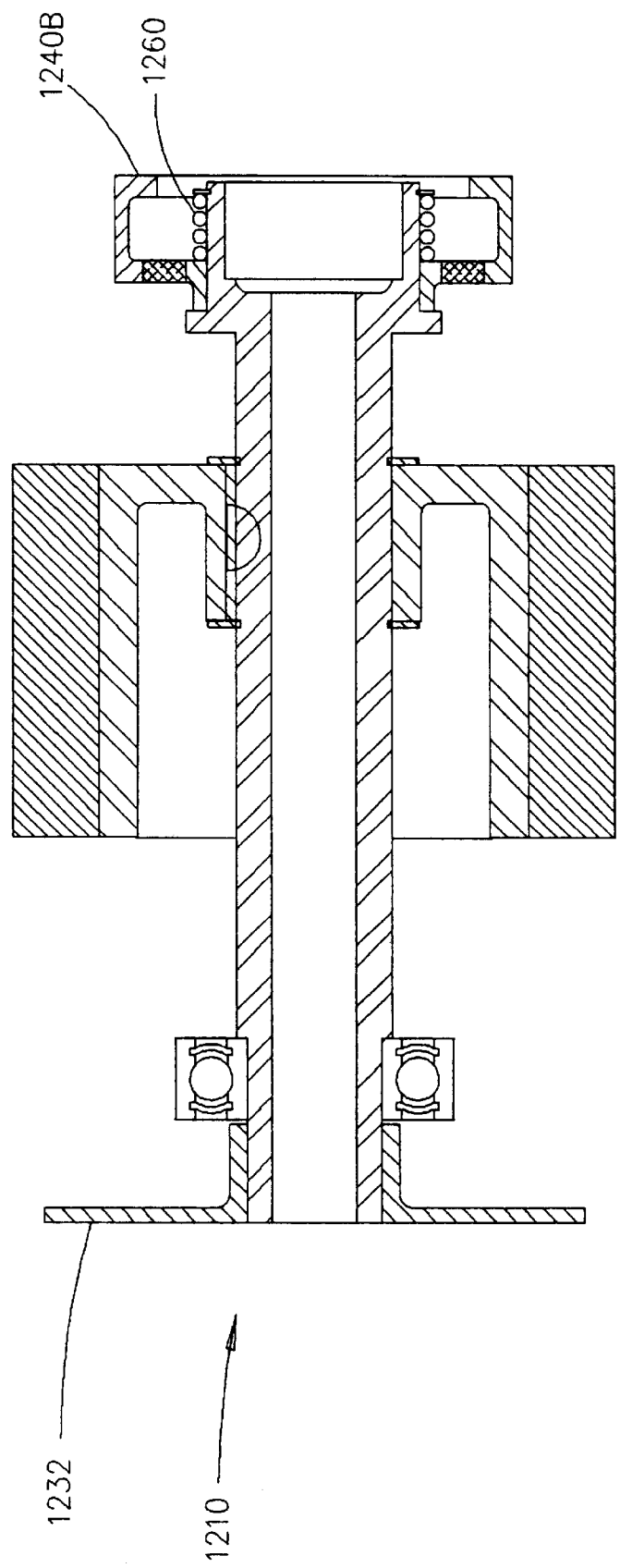
FIG. 14 is a cross-sectional view of a rotor assembly of the clutch assembly of FIG. 8.

In order to avoid the necessity of turning off the aircraft engine or turbine, for example, in the event of a short-circuit in the generator windings, a disconnect clutch may be employed. FIGS. 12–14 illustrate one embodiment of a clutch for a motor-generator which may be useful for that purpose. FIG. 12 illustrates a motor-generator with the clutch assembly in an engaged position. FIGS. 13 and 14 illustrate a quill shaft and a rotor assembly, respectively, of the motor-generator assembly. The motor-generator 610 includes the armature windings 608. A rotor 1210 with permanent magnets is located between the armature windings 608. A quill shaft 1220 is engageable with the rotor 1210 via the clutch assembly. The quill shaft 1220 comprises a torsional vibration damper 1230 for engagement with a friction plate 1232 of the rotor assembly. The rotor 1210 and the quill shaft 1220 engage each other via a toothed clutch 1240, which comprises a shaft toothed plate 1240a and a rotor toothed assembly 1240b, as illustrated in FIGS. 13 and 14. The clutch assembly comprises a clutch coil 1250 for generating a magnetic flux, causing engagement of the rotor 1210 to the shaft 1220. In absence of the magnetic flux, a return spring 1260 causes the rotor 1210 and the shaft 1220 to disengage.

In operation, the clutch is engaged before the start of the motoring action. When control circuitry senses symptoms of a partial or a complete short-circuit in the generator armature windings, for example, the clutch is disengaged so as to prevent a fire or other catastrophic failure. The parameters for use in sensing the symptoms are well known to those skilled in the art.

While particular embodiments of the present invention have been disclosed, it is to be understood that various different modifications and combinations are possible and are contemplated within the true spirit and scope of the appended claims. For example, it should be understood that the use of the motoring mode of operation disclosed herein applies not only to motor-generators but also to motors as well. There is no intention, therefore, of limitations to the exact abstract or disclosure herein presented.

What is claimed is:

1. A method of optimizing performance of a brushless electrodynamic machine, comprising:

monitoring an alternating-current voltage zero cross-over;

monitoring an alternating-current current zero cross-over;

changing a magnitude of an alternating-current voltage per Hz;

determining a phase relationship between said alternating-current voltage and said alternating-current current; and further changing said magnitude of said alternating-current voltage per Hz, said further change being in response to said phase relationship.

2. A method of optimizing performance of a brushless electrodynamic machine, comprising:

monitoring an alternating-current voltage zero cross-over;

monitoring an alternating-current current zero cross-over;

increasing a magnitude of an alternating-current voltage per Hz;

determining a phase relationship between said alternating-current voltage and said alternating-current current; and further increasing said magnitude of said alternating-current voltage per Hz when said phase relationship is current leading voltage and decreasing said magnitude of said alternating-current voltage per Hz when said phase relationship is current lagging voltage.

3. A method of optimizing performance of a brushless electrodynamic machine according to claim 1, further including:

using a stator having polyphase armature windings for polyphase operation;

using a rotor having at least one permanent magnet; and using controller means for applying alternating current to the armature windings, said controller means varying a magnitude of the alternating current voltage applied to the armature windings for controlling an operating motor power factor.

4. A method of optimizing performance of a brushless electrodynamic machine according to claim 3, further including maintaining said power factor at substantially 1.0 for minimum current per unit torque.

5. A method of optimizing performance of a brushless electrodynamic machine according to claim 3, further comprising:

selectively changing operation of said machine from a flux vector control mode to a volts-per-hertz mode of operation.

6. A method of optimizing performance of a brushless electrodynamic machine according to claim 5, further including changing modes of operation at a pre-selected motor speed.

7. A method of optimizing performance of a brushless electrodynamic machine according to claim 5, further comprising:

determining a phase relationship between alternating current and voltage applied to said armature windings during said volts-per-hertz mode; and adjusting said voltage to bring said voltage and said current in phase with each other.

8. A method of optimizing performance of a brushless electrodynamic machine according to claim 3, further comprising:

transitioning operation of said machine from a motor mode to a generator mode when a DC voltage in motor mode exceeds a predetermined threshold.

9. A method of optimizing performance of a brushless electrodynamic machine according to claim 3, further comprising:

selectively coupling and de-coupling mechanical power from said rotor to a driven load, or to said rotor from a driving source.

10. A method of optimizing performance of a brushless electrodynamic machine according to claim 1, further comprising:

monitoring a rotational speed of a motor;

accessing a table look-up to determine a magnitude of volts per Hz, said magnitude being optimal for a magnitude of load torque at said rotational speed; and applying said optimal magnitude of volts per Hz to said motor.

* * * * *